United States Patent
VanSelous et al.

(10) Patent No.: US 9,878,768 B1
(45) Date of Patent: *Jan. 30, 2018

(54) MARINE TRANSMISSION WITH SYNCHRONIZER TO SHIFT INTO HIGH SPEED GEAR

(71) Applicant: Brunswick Corporation, Lake Forest, IL (US)

(72) Inventors: Joseph S. VanSelous, Highland, MI (US); Eric Sharkness, Canton, MI (US); Jiri Jager, Prague (CZ)

(73) Assignee: Brunswick Corporation, Mettawa, IL (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/818,481

(22) Filed: Aug. 5, 2015

Related U.S. Application Data

(63) Continuation of application No. 13/839,724, filed on Mar. 15, 2013, now Pat. No. 9,133,910.

(51) Int. Cl.

| | |
|---|---|
| *F16H 3/08* | (2006.01) |
| *F16H 3/38* | (2006.01) |
| *B63H 23/04* | (2006.01) |
| *F16H 3/083* | (2006.01) |
| *F16H 3/091* | (2006.01) |
| *F16H 3/10* | (2006.01) |
| *B63H 23/02* | (2006.01) |

(52) U.S. Cl.
CPC .............. *B63H 23/04* (2013.01); *F16H 3/083* (2013.01); *F16H 3/0915* (2013.01); *F16H 3/10* (2013.01); *B63H 2023/0258* (2013.01); *F16H 2003/0818* (2013.01); *F16H 2003/0822* (2013.01); *F16H 2200/0034* (2013.01)

(58) Field of Classification Search
CPC ............. F16H 61/0403; F16H 2306/48; F16D 23/025; F16D 23/06
USPC ............ 74/325, 336 R, 339; 192/53.1–53.34
See application file for complete search history.

(56) References Cited

U.S. PATENT DOCUMENTS

| | | | |
|---|---|---|---|
| 1,979,077 A | 1/1934 | Pilaar | |
| 2,219,812 A | 10/1940 | Hochstetter | |
| 3,372,601 A | 3/1968 | Dry Claud et al. | |
| 3,700,083 A | 10/1972 | Ashikawa et al. | |
| 3,994,254 A | 11/1976 | Woodfill | |
| 4,173,939 A | 11/1979 | Strang | |
| 4,323,354 A | 4/1982 | Blanchard | |
| 4,331,432 A | 5/1982 | Blanchard | |
| 4,343,612 A | 8/1982 | Blanchard | |
| 4,400,163 A | 8/1983 | Blanchard | |
| 4,677,868 A | 7/1987 | Filkins | |
| 4,687,081 A * | 8/1987 | Osterloff | F16D 23/06 192/53.32 |
| 4,901,835 A * | 2/1990 | Frost | F16D 23/06 192/106 R |

(Continued)

*Primary Examiner* — Ha D Ho
(74) *Attorney, Agent, or Firm* — Andrus Intellectual Property Law, LLP

(57) ABSTRACT

A marine transmission includes a synchronizer on a counter rotating shaft to shift into a high speed gear. The synchronizer includes friction surfaces on both sides of the gear body for the high speed gear. The high speed gear mesh is helical and generates axial force that enhances the torque carrying capacity of synchronizing friction surfaces, thereby enabling the shifting into the high speed gear without torque interrupt.

19 Claims, 10 Drawing Sheets

(56) References Cited

U.S. PATENT DOCUMENTS

| | | | |
|---|---|---|---|
| 5,009,621 A | 4/1991 | Bankstahl et al. | |
| 5,135,087 A * | 8/1992 | Frost | F16D 23/06 |
| | | | 192/53.31 |
| 5,394,764 A | 3/1995 | Fini, Jr. | |
| 5,538,119 A | 7/1996 | Johnson, Jr. | |
| 5,711,742 A | 1/1998 | Leinonen et al. | |
| 5,758,753 A * | 6/1998 | Sypula | F16D 23/025 |
| | | | 192/53.32 |
| 6,027,424 A | 2/2000 | Reynolds | |
| 6,350,165 B1 | 2/2002 | Nelsen | |
| 6,435,923 B1 | 8/2002 | Ferguson | |
| 6,533,091 B1 | 3/2003 | Kawada et al. | |
| 6,554,663 B2 | 4/2003 | Neisen | |
| 6,582,259 B1 | 6/2003 | Mansson et al. | |
| 6,588,562 B2 | 7/2003 | Fernandez | |
| 6,960,107 B1 | 11/2005 | Schaub et al. | |
| 6,966,805 B1 | 11/2005 | Caldwell | |
| 7,291,048 B1 | 11/2007 | Phillips et al. | |
| 7,318,761 B1 | 1/2008 | Mansfield et al. | |
| 7,361,069 B2 | 4/2008 | Mansfield et al. | |
| 7,506,739 B2 | 3/2009 | Razzacki | |
| 7,544,110 B1 | 6/2009 | Phillips et al. | |
| 7,559,415 B2 | 7/2009 | Braford, Jr. | |
| 7,685,899 B2 | 3/2010 | Mowbray et al. | |
| 7,704,108 B2 | 4/2010 | Oguma et al. | |
| 7,704,183 B2 | 4/2010 | Nakamura et al. | |
| 7,727,037 B2 | 6/2010 | Fukuoka et al. | |
| 7,762,858 B2 | 7/2010 | Suzuki et al. | |
| 7,762,859 B2 | 7/2010 | Suzuki et al. | |
| 7,798,874 B2 | 9/2010 | Fukuoka | |
| 7,811,141 B2 | 10/2010 | Fukuoka | |
| 7,892,056 B2 | 2/2011 | Okabe et al. | |
| 7,909,670 B2 | 3/2011 | Suzuki et al. | |
| 7,931,511 B2 | 4/2011 | Suzuki et al. | |
| 7,931,513 B2 | 4/2011 | Suzuki et al. | |
| 7,934,964 B2 | 5/2011 | Fukuoka | |
| 7,942,712 B2 | 5/2011 | Suzuki et al. | |
| 8,047,885 B2 | 11/2011 | Nakamura et al. | |
| 8,157,694 B2 | 4/2012 | Nakamura et al. | |
| 2004/0154892 A1 * | 8/2004 | Coxon | F16D 23/06 |
| | | | 192/53.31 |
| 2007/0125192 A1 | 6/2007 | Mowbray et al. | |
| 2007/0199792 A1 | 8/2007 | Aschauer | |
| 2010/0248565 A1 | 9/2010 | Okabe et al. | |

* cited by examiner

MARINE TRANSMISSION WITH SYNCHRONIZER TO SHIFT INTO HIGH SPEED GEAR

CROSS REFERENCE TO RELATED APPLICATION

This application is a continuation of U.S. patent application Ser. No. 13/839,724, filed Mar. 15, 2013, which is incorporated herein by reference in entirety.

BACKGROUND

This disclosure pertains to transmissions and more particularly to two-speed transmissions for marine propulsion.

Shifting from a low speed gear to a high speed gear using a synchronizer normally requires a torque interrupt. In marine applications, this torque interrupt is highly undesirable since it can result in rapid deceleration of the watercraft and an objectionable feel to occupants in the watercraft. For example, a typical shift from a low speed gear to a high speed gear in a marine application may take approximately 0.15 seconds in which time it is common to cut engine speed and reduce the torque load to zero in order to enable shifting from low speed gear and into high gear. This sudden loss of torque leads to the undesirable deceleration and a hard shift since the load on a propeller, especially at cruising speed, is significant.

One known technique to help soften the shift into a high speed gear is to use a one-way overrunning clutch on the output shaft. In such a system, the low speed gear remains engaged to drive the output shaft until the high speed gear is engaged to drive the output shaft at a higher speed than what it is being driven by the low speed gear. An example of such a system is disclosed in U.S. Pat. No. 4,173,939 entitled "Two-Speed Transmission" by Charles Strang, issuing on Nov. 13, 1979. The Strang '939 patent uses a centrifugal clutch to automatically engage the high speed gear in response to rotation of the input shaft above a predetermined speed.

Synchronizer clutch mechanisms are widespread in automotive applications. Traditional synchronizer systems have insufficient torque carrying capacity and thermal capacity for shifting from low speed to high speed in marine applications. Moreover, traditional synchronizers are not capable of locking without a torque interrupt. Despite the apparent drawbacks associated with the use synchronizers for marine applications, it would be desirable to implement synchronizer technology in a way that enables shifting into the high speed gear of a marine transmission without torque interrupt and the associated undesirable deceleration. It would also be desirable to implement such improved synchronizer technology on a vertically oriented marine drive, so that the synchronizer is easy to use in outboard motors and stem drives alike.

SUMMARY

An exemplary embodiment is implemented in a transmission having an input drive shaft, an output shaft and a counter-rotating shaft arranged parallel to the input and output shafts. The input shaft is rotated by and receives torque from the engine. The output shaft is drivingly connected to one or more propellers. The counter-rotating shaft includes a high speed gear and a low speed gear each mounted coaxially with and free to rotate about the counter-rotating shaft. The counter-rotating shaft includes a driven gear that is in constant mesh with a driving gear on the input shaft so that the counter-rotating shaft counter-rotates with the input shaft. The high speed gear inter-meshes with a driven high speed gear on the output shaft and the low speed gear inter-meshes with the driven low speed gear on the output shaft. A one-way clutch mechanism enables the output shaft to rotate faster than the driven low speed gear when the angular speed of the driven high speed gear on the output shaft is greater than that of the low speed gear. The transmission includes a high speed synchronizing clutch mechanism that engages the high speed gear on the counter-rotating shaft so that it rotates at the same speed as the counter-rotating shaft. This is accomplished with the low speed gear on the counter-rotating shaft engaged. The low speed gear is not disengaged in order to engage the high speed gear. Nor does the high speed synchronizing clutch mechanism require a significant reduction of engine torque in order to shift at cruising speed.

A high speed synchronizing clutch mechanism constructed in accordance with the exemplary embodiment is able to develop torque carrying capacity substantially equal to the engine torque prior to shifting. This is accomplished, in part, by providing friction cones on both ends of the body of the high speed gear. It is expected that the transmission will normally be implemented in a vertical orientation, and with one friction cone on the bottom side of the body of the high speed gear and at least one friction cone, but preferably two friction cones, on the top side of the body of the high speed gear. The synchronizer hub and sleeve are located on the counter-rotating shaft below the body of the high speed gear. Clutch engagement teeth are fixed to the body of the high speed gear between the gear mesh and the lower friction cone. It is desired that the gear mesh be helical, although aspects of the invention can be implemented with spur gears. The helical gear mesh results in an upward axial reaction force when synchronization is initiated. The upward axial force drives the body of the high speed gear upward and significantly increases synchronizer gain. The upward force at the top side of the body of the high speed gear is therefore higher than the shifting force applied to the lower side of the body of the high speed gear. Even pressure distribution is achieved by providing more friction area on the reaction side, (i.e. the top side of the body of the high speed gear) versus the apply side (i.e. the lower side of the body of the high speed gear). Thus, in the exemplary embodiment of the invention, the bottom surface of the driven gear on the counter-rotating shaft includes an inner friction cone and an outer friction cone, and the top of the body of the high speed gear also includes an outer friction cone and an inner friction cone. A set of friction rings is located between the inner friction cones for the body of the high speed gear and the body of the driven gear on the counter-rotating shaft, and another set of friction rings is located between the outer cones of the body of the high speed gear and the body of the driven gear on the counter-rotating shaft. This results in six synchronizing friction surfaces on the top side of the body of the high speed gear. The lower side of the body of the high speed gear includes a single friction cone and a friction ring. The synchronizer hub has a blocker ring and a friction ring held in the well of a hub. This results in three synchronizing friction surfaces on the lower side of the body of the high speed gear.

Engagement of the high speed gear is initiated by sliding the synchronizer shifting sleeve upward with sufficient force to cause the nine (9) friction surfaces to develop torque carrying capacity. This consequently causes the helical gear mesh on the driven high speed gear to impart a reaction force with a significant axial component to the helical gear mesh on the high speed gear on the counter rotating shaft, which further develops the torque carrying capacity of the friction surfaces. With continued application of shifting force to the sleeve, torque carrying capacity substantially equal to the engine torque is accomplished completely and quickly. Once synchronized speeds have been achieved (i.e., the high speed gear is rotating at the same angular speed as the counter rotating shaft), the shifting force applied to the sleeve is increased and the blocker ring releases allowing the sleeve to make a final hard connection to the engagement teeth on the body of the high speed gear.

It bears emphasizing that torque capacity is enhanced because the use of the helical gear mesh provides an axial reaction force upward against the friction surfaces between the body of the high speed gear and the body of the driven gear on the counter-rotating shaft. The use of the reaction force greatly reduces the required shifting force applied to the synchronizer sleeve. It also bears emphasizing that, in the exemplary embodiment, there are a total of six frictional interfaces on the top side of the body of the high speed gear and three frictional interfaces on the bottom side of the body of the high speed gear. These nine frictional interfaces are capable of providing significantly more torque carrying capacity than a conventional synchronizer. In order to maximize the benefit of these features, it is important to balance the torque carrying capacity on the top side and bottom side of the body of the high speed gear in proportion to the applied force provided by the shifting actuator compared to the axial force provided on reaction force on the helical gear mesh. The goal being to balance contact pressure among the various friction surfaces.

Down shifting in this system is a trivial matter. The shift sleeve is simply moved downward to disengage the high speed gear. The one-way clutch in the torque flow path of the low speed gear engages if and when the watercraft is accelerated. The low speed forward gear is desirably engaged using a second synchronizer. Preferably, the counter-rotating shaft is also provided with a reverse driving gear so the second synchronizer is operated to shift into a low speed forward position, a neutral position and a reverse position. Torque interrupt is not an issue when shifting from neutral to low speed forward, or from neutral to reverse, therefore the second synchronizer does not require the additional frictions surfaces discussed above with respect to the high speed synchronizer.

A barrel cam mechanism, preferably power assisted, is used to move the shifting sleeve on the second synchronizer between forward, neutral and reverse positions, and also to move the shifting sleeve on the high speed synchronizer to engage the high speed gear as described above.

Another aspect involves the use of a spring mechanism that biases synchronizer components, and in particular the blocker rings and the high speed gear body from dragging or rubbing inadvertently on adjacent components.

The high speed synchronizing clutch mechanism as described above is implemented to engage a high speed gear located on the counter rotating shaft but the high speed gear and synchronizing clutch mechanism can be located on the input shaft or output shaft as well if desired. Further, the high speed synchronizing clutch mechanism can be employed in a variety of transmissions having different shaft configurations. The high speed synchronizing clutch mechanism can generally be employed in a transmission in which the high speed gear is mounted coaxially with and free to rotate about a first shaft and the driven high speed gear is fixed on a second shaft. For example, the high speed gear and high speed synchronizer can be located on the input shaft in a transmission having a counter rotating output shaft.

DETAILED DESCRIPTION OF THE DRAWINGS

Figure 1:
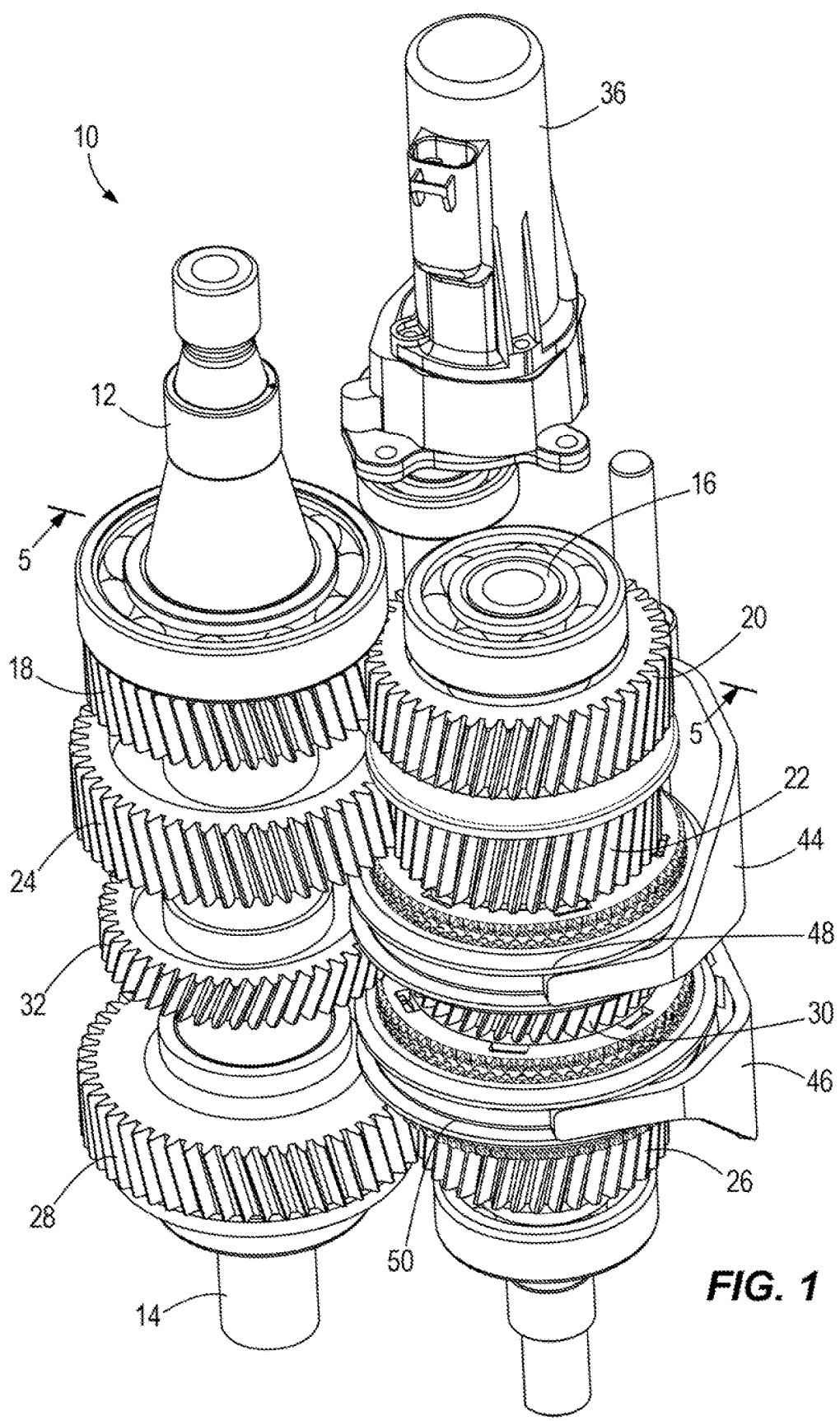
FIG. 1 is a perspective view of a two-speed forward, neutral, reverse transmission constructed in accordance with an exemplary embodiment of the invention.
Figure 2:
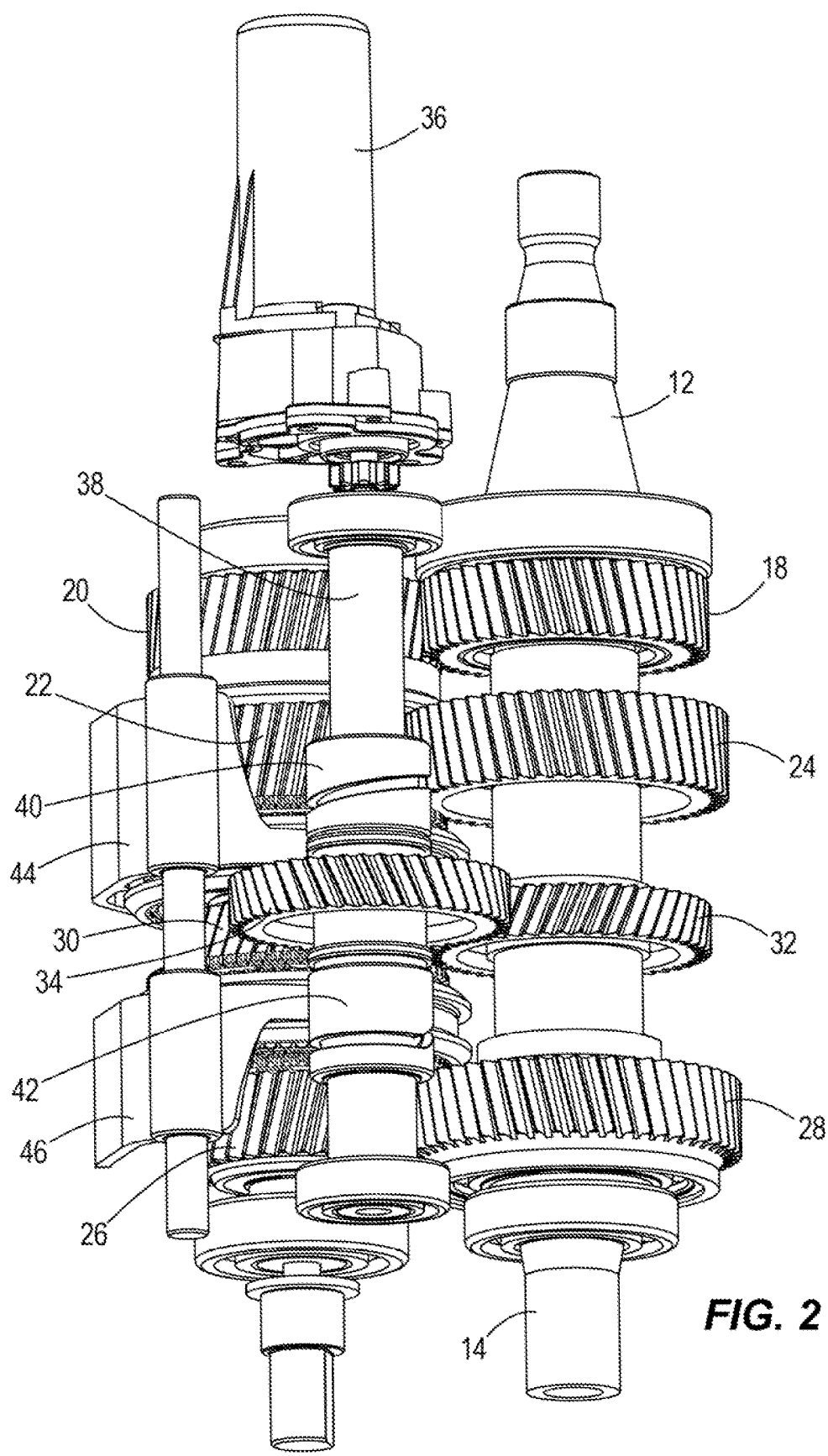
FIG. 2 is a perspective view taken from the other side of the transmission illustrated in FIG. 1.

Referring to FIGS. 1 and 2, the illustrated transmission 10 is able to shift between neutral, reverse, low-speed forward and high-speed forward gears. The transmission 10 includes an input shaft 12 that is rotated by and receives torque from the engine. An output shaft 14 is arranged along the same axis of rotation as the input shaft 12. A counter-rotating shaft 16 is mounted parallel to the input 12 and output 14 shafts. The output shaft 14 is drivingly connected to one or more propellers, preferably through permanently meshed bevel gears in the propeller housing (not shown).

A first driving gear 18 is fixed on the input shaft 12 and rotates in common with the input shaft 12. A first driven gear 20 is fixed on the counter-rotating shaft 16 and rotates in unison with the counter-rotating shaft 16. The first driven gear on the counter-rotating shaft is in constant mesh with the first driving gear 18 on the input shaft 12. A high speed gear 22 is mounted for rotation coaxially with the counter-rotating shaft 16. The high speed gear 22 is free to rotate independently of the counter-rotating shaft 16 unless it is engaged by a synchronizer as discussed below in which case it rotates at the same angular speed as the counter-rotating shaft 16. A low speed gear 26 is also mounted for rotation coaxially on the counter-rotating shaft 16. A driven high speed gear 24 is mounted on the output shaft 14 and is fixed to rotate in unison with the output shaft 14. The driven high speed gear 24 on the output shaft 14 is in constant mesh with the high speed gear 22 on the counter-rotating shaft 16. The low speed gear 26 on the counter rotating shaft 16 is also free to rotate independently of the rotation of the counter-rotating shaft 16 unless a synchronizer engages the gear 26 to rotate at the same angular speed as the counter-rotating shaft 16. A driven low speed gear 28 is mounted to the output shaft 14 via a one-way clutch mechanism (see, e.g., reference number 138 in FIG. 5). The driven low speed gear 28 is in constant mesh with the high speed gear 26 on the counter-rotating shaft 16.

A reverse driving gear 30 is also mounted for rotation coaxially on the counter-rotating shaft 16 and is free to rotate independently with respect to the counter-rotating shaft 16 unless engaged by a synchronizer. The reverse driving gear 32 is in constant mesh with a reverse idler gear 34 (see FIG. 2) that is mounted on shift shaft 38. The reverse idler gear 34 is in turn in constant mesh with a driven reverse gear 32 mounted on the output shaft 14.

Desirably, all of the gears have a helical gear mesh. As mentioned above, the helical geometry is particularly advantageous with respect to the high speed gear 22 because the helical gear mesh generates an axial, upward reaction force on the body of the high speed gear 22, which in turn facilitates fast efficient synchronization and complete engagement of the high speed gear 22.

Referring in particular to FIG. 2, an electromechanical actuator 36 turns shift shaft 38 to shift to a neutral position, a reverse position, low speed forward position, and high speed forward position. Barrel cams 40, 42 include cam grooves that are mated with shifting forks 44, 46 respectively in order to move the shifting forks 44, 46 upward or downward. Shifting fork 46 shifts synchronizer 50 between a neutral position, a reverse position (upward) and low speed forward position (downward). Shifting fork 44 moves synchronizer assembly 48 upward to shift the transmission 10 to engage the high speed forward gear 22. The high speed gear 22 is engaged only when the low speed gear 26 is engaged as well. The one-way clutch mechanism 38 used to mount the driven low speed gear 28 on the output shaft 14 enables the output shaft 14 to overrun or rotate faster than the rotation of the driven low gear 28 when the high speed gear 22 is engaged to drive the driven high speed gear 24 on the output shaft 14.

The synchronizer assembly 50 is similar in many ways to conventional synchronizers for shifting between neutral, forward and reverse gears. When shifting from neutral to reverse or from neutral to low gear, engine torque is typically zero or near zero when shifting occurs. The high speed synchronizer assembly 48, however, must be able to generate torque carrying capacity in order to let the synchronizer blocker ring release and make the final hard connection.

Figure 3:
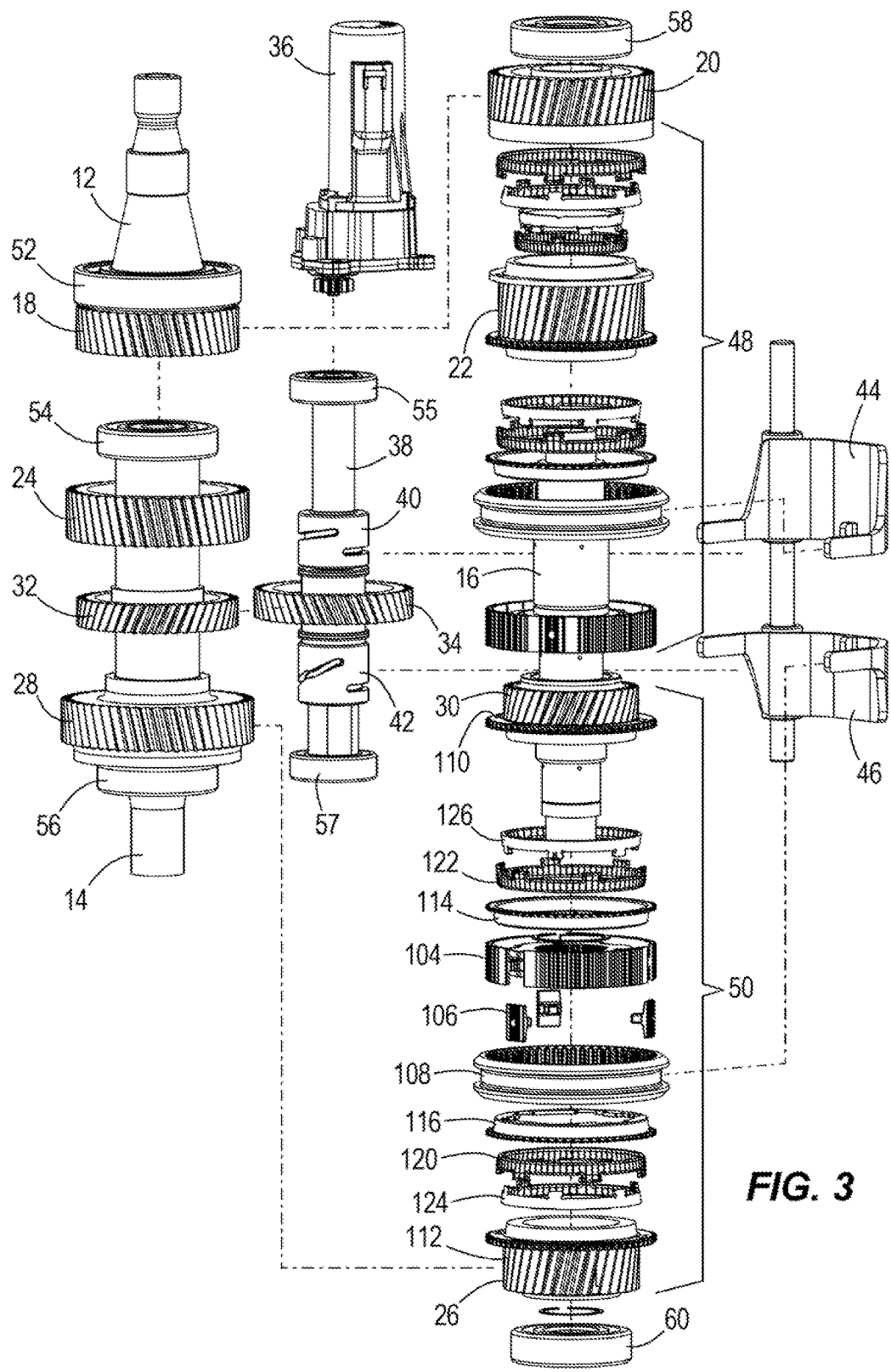
FIG. 3 is an assembly drawing illustrating the major components of the transmission illustrated in FIGS. 1 and 2.

Referring to the assembly drawing of FIG. 3, a ball bearing 52 is used to mount the input driveshaft 12 in a generally vertical orientation with the drive housing (not shown). Ball bearings 54, 56 are also used to mount the output shaft 14 along the same axis of rotation of the input shaft 12. Roller bearings 58 and 60 are used to mount the counter-rotating shaft 16 in parallel with the input 12 and output shafts 14. The rotation of the output shaft 14, of course, is mandated by the engagement of gears on the counter-rotating shaft 16.

Figure 4:
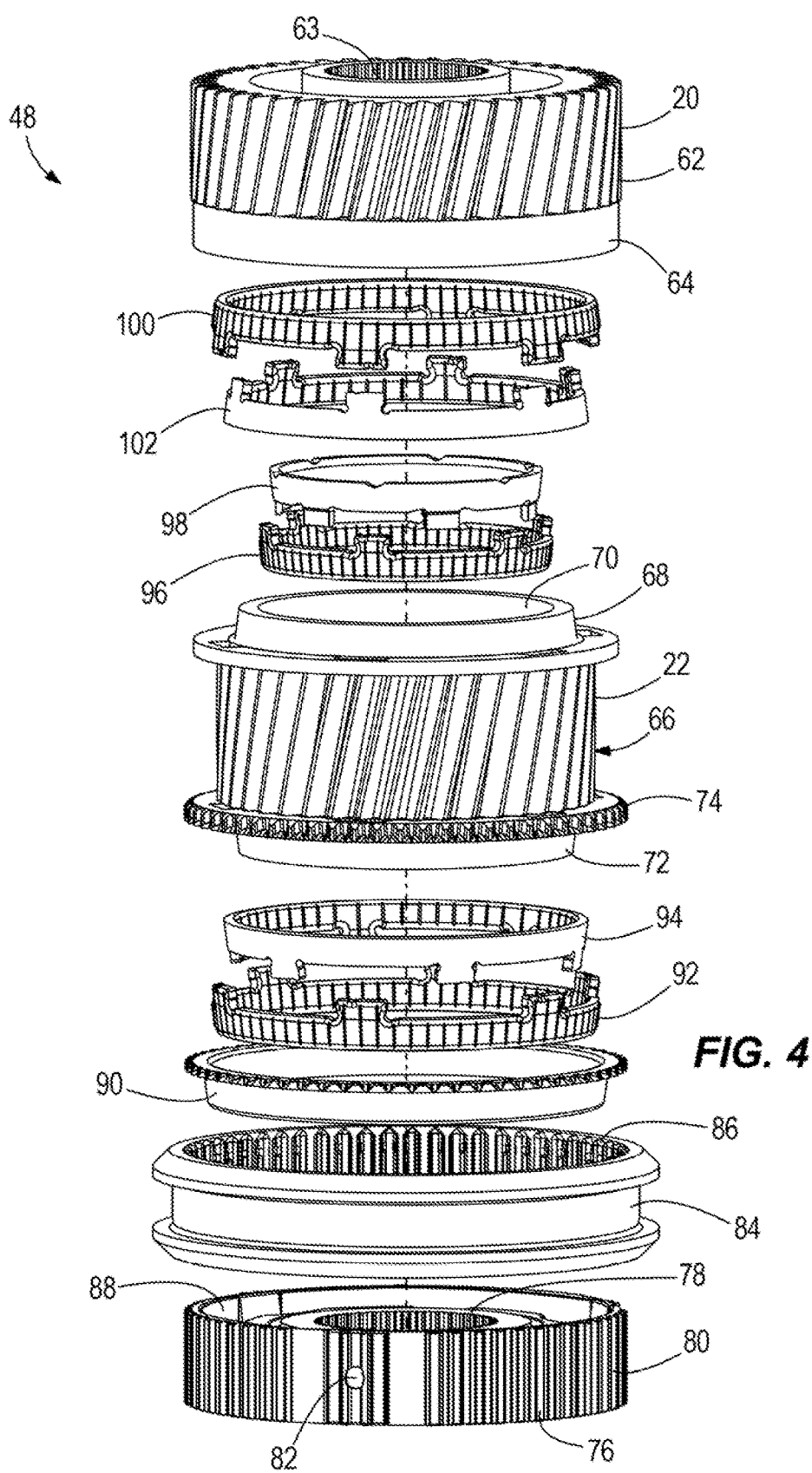
FIG. 4 is an assembly drawing showing the parts of a high-speed synchronizer constructed in accordance with an exemplary embodiment of the invention.

The components of the high speed synchronizer assembly 48 are shown in detail in FIG. 4. Referring to FIG. 4, the body 62 of the driven gear 20 has a splined internal opening 63 to mount the driven gear 20 for common rotation with the counter-rotating shaft 16. The gear body 62 also includes a lower surface 64 below the gear mesh 20. Although not shown in FIG. 4, the lower surface 64 of the gear body 62 includes inner and outer friction cones (see, e.g., reference numbers 104, 106 in FIG. 9). The high speed mesh 22 is part of a gear body 66 which as mentioned is mounted to rotate freely about the counter-rotating shaft 16 unless engaged by the synchronizer 48 to rotate in unison with the counter-rotating shaft 16. A synchronizer hub 76 includes a splined inner opening 78 that mounts on the counter-rotating shaft 16 so that the hub 76 rotates in common with the counter-rotating shaft 16. The hub 76 also includes external splines 80, and struts 82 with ball and spring detent actuators 81. The synchronizer sleeve 84 includes internal splines 86 and detents corresponding to the neutral height on the sleeve 84. The sleeve 84 is mounted over the hub 76 and rotates with the hub 76 and the counter-rotating shaft 16. The sliding sleeve 84 is moved upward by the shifting fork 44 (FIG. 3) to initiate the shifting procedure. The hub 76 also includes an annular well 88 in which the synchronizer blocker ring 90 resides. The blocker ring 90 is a conventional blocker ring having synchronization blocking teeth. The system includes a double-sided friction ring 92 tabbed to the body 66 of the high speed gear 22, and a single-sided friction ring 94 tabbed to the synchronization Hecker. A friction cone 72 is located on the bottom of the body 66 for the high speed gear 22. There are therefore three (3) friction surfaces that engage below the body 66 of the high speed gear 22 once shifting into high gear is initiated. The gear body 66 for the high speed gear 22 also includes clutch engagement teeth 74 between the lower friction cone 72 and the gear mesh 22. The internal splines 86 on the sliding sleeve 84 engage the engagement teeth 74 on the body 66 when the high speed gear 22 is fully engaged. The top side of the gear body 66 for the high speed gear 22, above the high speed gear mesh 22, includes an inner friction cone 70 and an outer friction cone 68. There are an inner set of friction rings 96, 98 and an outer set of friction rings 100, 102. Inner friction ring 96 is double-sided and tabbed to the body 66 for the high speed gear 22, and inner friction ring 98 is single-sided and tabbed to the body 62 of the driven gear 20. Outer friction ring 100 is double-sided and tabbed to the body 66 for the high speed gear 22 and outer friction ring 102 is single-sided and tabbed to the body 62 of the driven gear 20. Between the friction cones 68, 70 on the top side of the body 66 for the high speed gear 22, the friction cones 104, 106 on the bottom surface of the body 62 of the driven gear 20, and the friction rings 96, 98, 100, 102, there are therefore six (6) friction surfaces that engage above the body 66 of the high speed gear 22 once shifting into high gear is initiated.

Referring again to FIG. 3, the synchronizer 50 for the neutral, low speed forward and reverse positions is now described. The synchronizer assembly 50 includes a synchronizer hub 104 that is splined to the counter-rotating shaft 16 including ball and struts 106 including ball and spring detent actuators. A sliding sleeve 108 is mounted over the hub 104 and rotates in common with the hub 104 but can be moved upward or downward by shifting fork 46. The reverse gear mesh 30 is on gear body 110 that also includes clutch engagement teeth and a lower surface with a friction cone. Similarly, the low speed gear mesh 26 is on gear body 112 that also includes clutch engagement teeth and a friction cone. Double-sided friction rings 120, 122 and single-sided friction rings 124, 126 are tabbed to the synchronizer hub 104 and the gear bodies 110, 112 as shown. Blocker rings 114, 116 and the friction rings 120, 122, 124, 126 are located between the hub 104 and the respective friction cones on the gear bodies 110 and 112.

Figure 5:
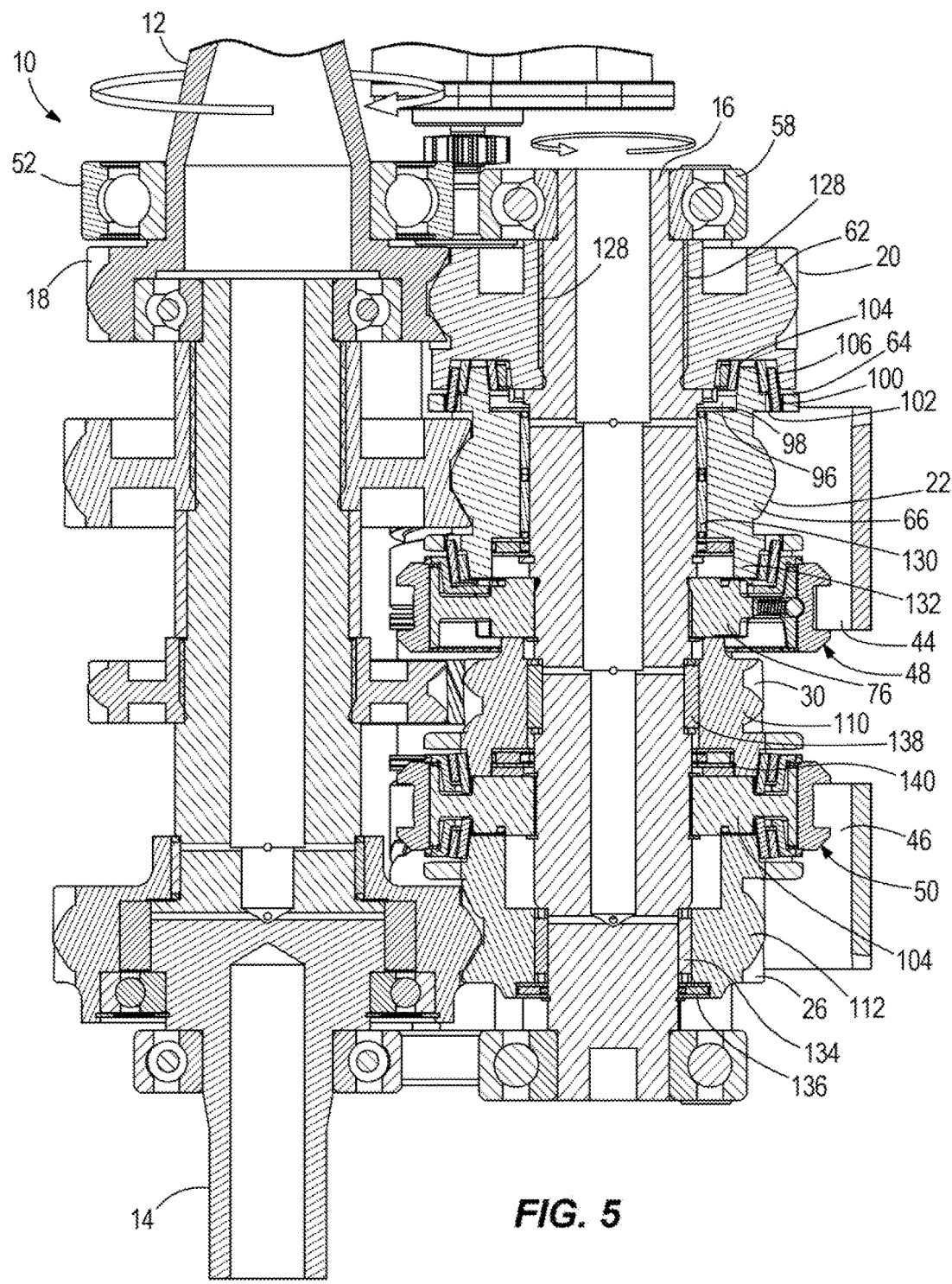
FIG. 5 is a longitudinal cross-section taken along lines 5-5 in FIG. 1 showing the transmission in a neutral position.

FIG. 5 shows the transmission 10 in a neutral position. The input shaft 12 is shown rotating in the clockwise direction when viewed from the direction in which the torque flow path progresses through the transmission 10. The counter-rotating shaft 16 counter-rotates as depicted by the arrow above the counter-rotating shaft 16. The gear body 62 for the driven gear 20 is splined to the counter-rotating shaft 16 as depicted by the interface at reference number 128. When in the neutral position, both the high-speed synchronizer 48 and the second synchronizer 50 are in a neutral position so that all driving gears 22, 26, and 30 on the counter rotating shaft 16 rotate freely with respect to the counter rotating shaft 16.

Figure 9:
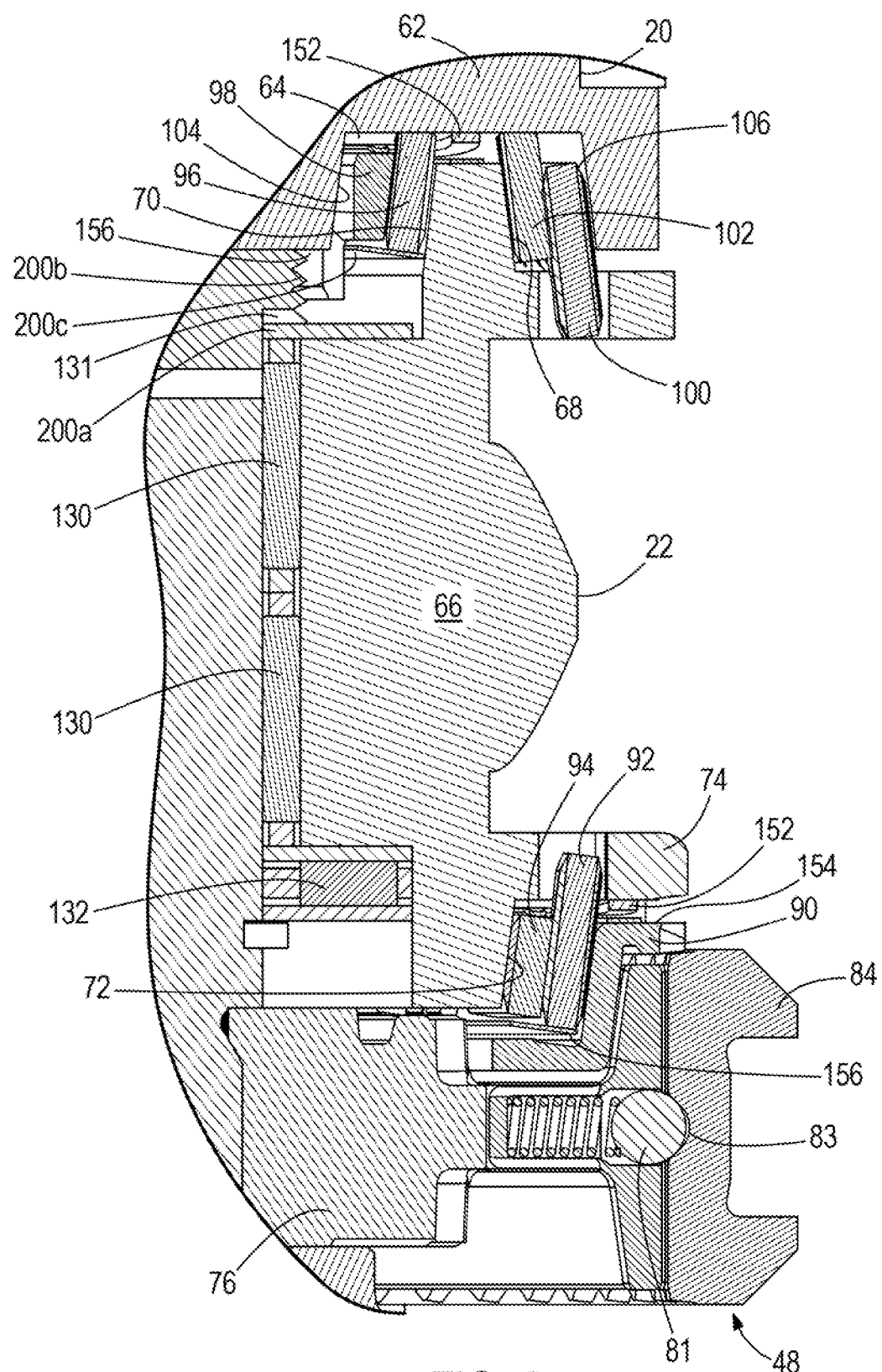
FIG. 9 is a detailed view of part of the exemplary high-speed synchronizer shifted into the neutral position.

Referring now to both FIGS. 5 and 9, the lower surface 64 of the gear body 62 for the driven gear 20 includes, as mentioned, an inner cone surface 106 and an outer cone surface 104. As described previously, there is a set of friction rings 100, 102 between the outer cone surface 106 on the bottom of the gear body 62 for the driven gear 20 and the outer friction cone 68 on the top of the high speed gear body 66. There is also a set of friction rings 96, 98 between the inner cone surface 104 on the bottom of the gear body 62 for the driven gear 20 and the outer friction cone 70 on the top of the high speed gear body 66.

The high speed gear body 66 is mounted to the counter-rotating shaft 16 via needle bearings 130 and thrust bearing 132. The high speed gear body 66 is thus free to rotate independently of the counter-rotating shaft 16 unless engaged by the synchronizer 48. Reference number 131 identifies a small amount of axial clearance between the gear body 66 and the counter rotating shaft 16. The body 66 of the high speed gear is able to move upward and downward slightly in response to pressure applied by the shifting fork 44. When shifting into high gear, the gear body 66 for the high speed gear 22 moves upward slightly into this clearance 131. Below the clearance is a thrust washer 200a which is held downward by a series of coil springs 200b located in pockets 200c.

Figure 10:
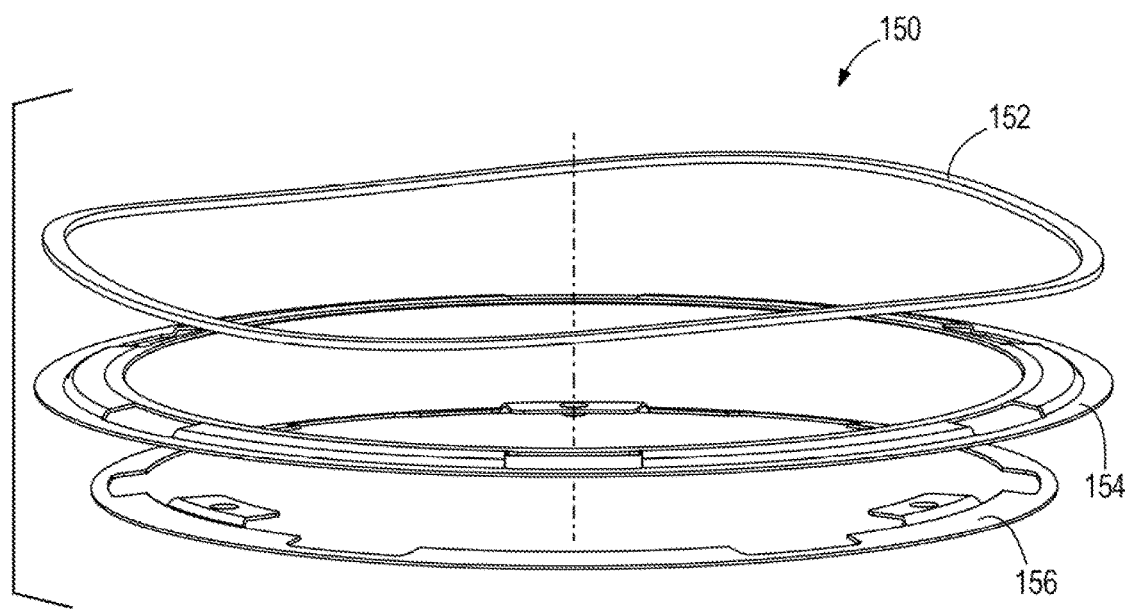
FIG. 10 shows component parts of a spring biasing mechanism for holding the blocking rings towards the synchronizer hub.

When the transmission 10 is not in a high speed forward position, the high speed synchronizer assembly 48 is positioned as shown in FIG. 9, and so there is clearance between the respective moving friction surfaces. In FIG. 9, the ball and spring detent actuator 81 is engaged with detent 83 on the sliding sleeve 84 to hold the sliding sleeve 84 in a centered neutral position. While the high speed gear body is free rotate with respect to the counter rotating shaft 16, the synchronizer Hecker and the components attached to the Hecker rotate in unison with the counter rotating shaft 16, including the sleeve 84, the blocker ring 90 and friction ring 94. Friction ring 92 is tabbed to the gear body 66 for the high speed gear 22. FIG. 10 illustrates components of a spring biasing mechanism 150 that helps to prevent frictional drag from occurring between synchronizer components that are rotating at different speeds. The spring biasing mechanism includes a spring 152, a retainer 154, and a spring support ring 156. Coil springs (not shown) are attached to the spring support ring 156. It is desired to use spring biasing at both the top and bottom side of the body 66 for the high speed gear 22. On the bottom side, the retainer ring 154 holds the blocker ring 90 in the well of the synchronizer Hecker. Spring 152 biases the gear body 66 away from the blocker ring 90, and spring support 154 biases friction ring 92 (attached to the body 66 of the high speed gear) away from the base of the blocker ring 90 in the well of the synchronizer Hecker. On the top side, spring 152 biases the gear body 66 away from the bottom surface 64 of the gear body 62 for the driven gear 22, and spring support 154 biases friction ring 96 (attached to the body 62 of the driven gear) away from the body 66 of the high speed gear 22.

Referring again to FIG. 5, the gear body 112 for the low speed gear 26 is mounted to the counter-rotating shaft 16 via a needle bearing 134 and a thrust bearing 136. In addition, the gear body 110 for the reverse driving gear 30 is also mounted to the counter-rotating shaft 16 via a needle bearing 138 and a thrust bearing 140. When in the neutral position, the synchronization hub 104 for the second synchronizer 50 is held in a neutral position such that the blocker rings 114, 116 and friction rings 120, 122, 124, 126 (see FIG. 3) do not engage or drag. For this purpose it may be desirable to provide a spring biasing and retainer mechanism as discussed above to ensure proper clearance, particularly on the lower side of the synchronizer hub 104 because the transmission 10 is mounted vertically.

Figure 6:
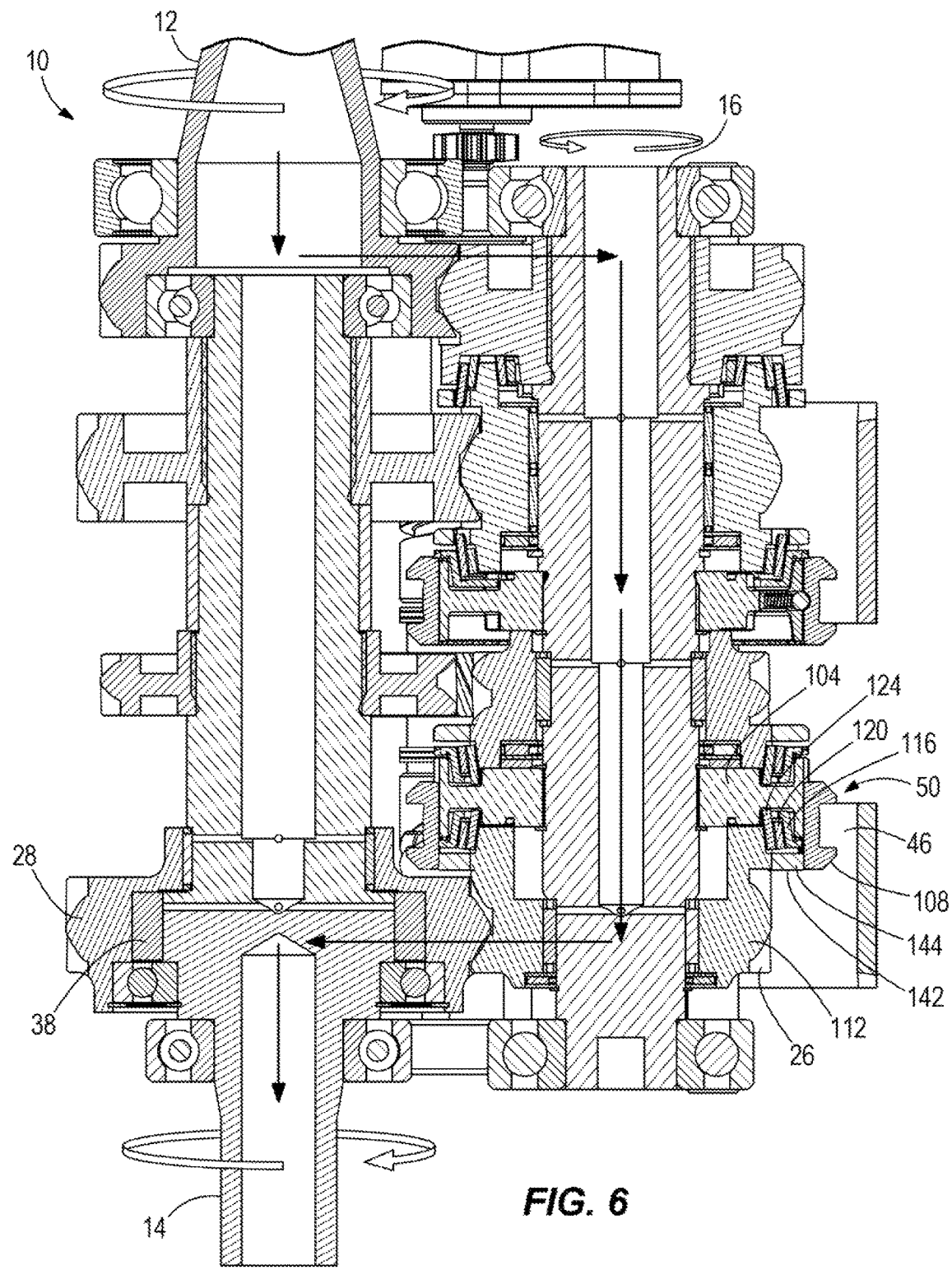
FIG. 6 is a view similar to FIG. 5 showing the transmission in a forward low speed position.

FIG. 6 illustrates the transmission 10 shifted into the low speed forward position. The bold arrows in FIG. 6 show the general path of the torque when the transmission 10 is shifted into the low speed forward position. Those skilled in the art will understand that the actual path of the torque passes through the synchronizer hub 104, sliding sleeve 108, engagement teeth 142 on the gear body 112 and through the gear mesh 26 to the driven gear 28. In FIG. 6, the sliding synchronizer sleeve 108 has being slid downward by the shifting fork 46 and it is fully engaged with the teeth 144 on the gear body 112 for the low speed gear 26. The gear body 112 includes a friction cone 142. Friction ring 120 is tabbed to the gear body 112 as well. Blocker ring 116 and friction ring 124 on the hub 104 are engaged when the downward shift is initiated. As is known in the art, the blocker ring 116 blocks the passage of the sliding sleeve 108 until the friction surfaces have been sufficiently engaged to bring the low speed gear body 112 up to the same rotational speed as the hub 104 and sleeve 108 of the synchronizer, at which time the blocker ring 106 releases to allow passage of the sliding sleeve 108 to engage with the teeth 144 on the gear body 112.

Figure 7:
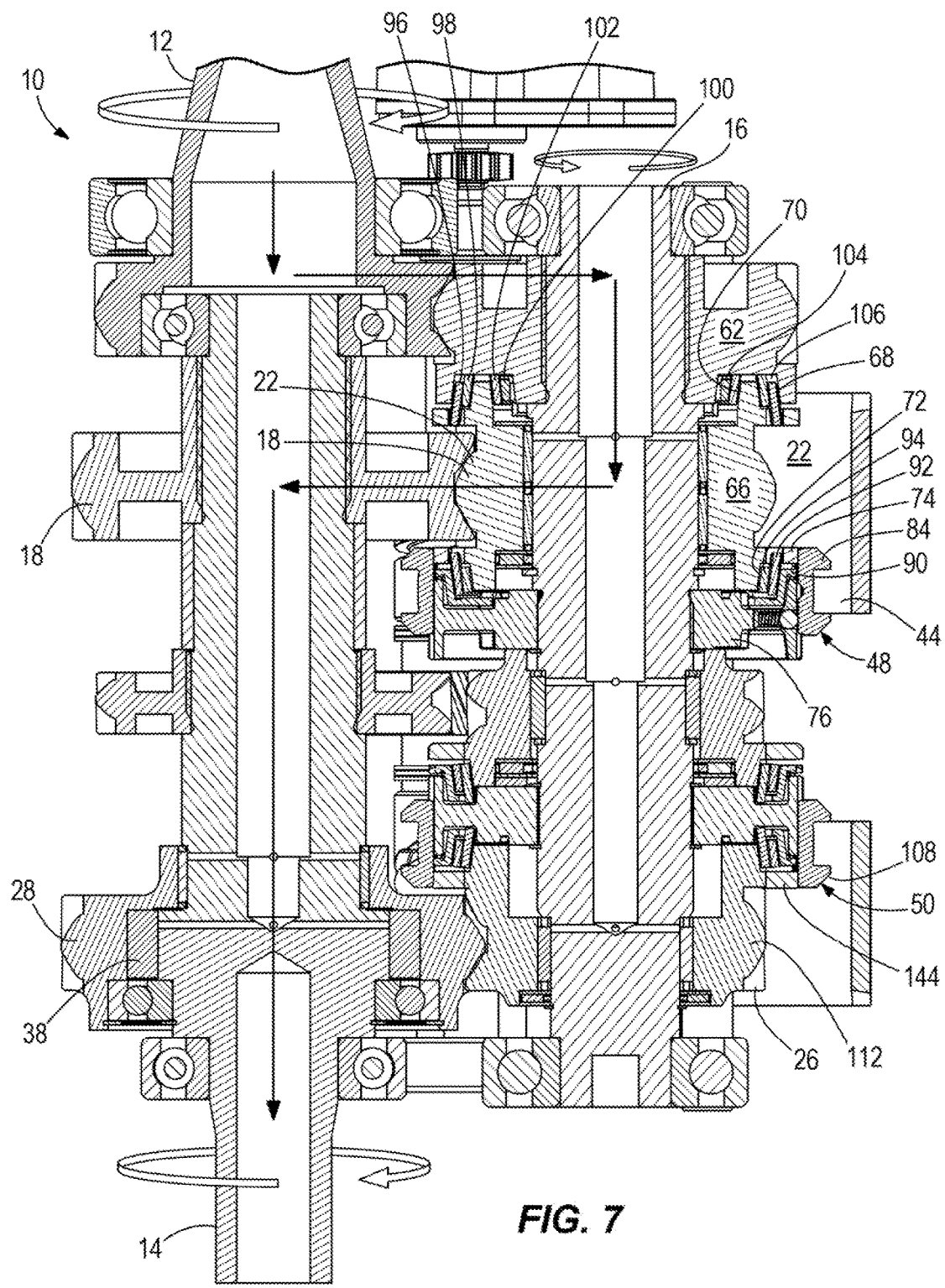
FIG. 7 is a view similar to FIGS. 5 and 6 showing the transmission in a forward high speed position.

FIG. 7 illustrates the transmission 10 shifted into the forward high gear position. In the forward high gear position, as illustrated in FIG. 7, the synchronizer 50 for the low speed gear 26 remains engaged such that the sliding sleeve 108 engages the teeth 144 on the body of the low speed gear 26. The low speed gear 26 is in constant mesh with the driven low speed gear 28. However, since the driven low speed gear 28 is mounted to the output shaft 14 using an overrunning clutch 38, the angular speed of the output shaft 14 exceeds that of the driven low speed gear 28 when the high speed gear 22 is engaged as illustrated in FIG. 7. FIG. 7 also shows the synchronizer sleeve 84 for the high-speed gear shifted upward by the fork 44 to engage the teeth 74 on the body 66 of the high speed gear 22. When the shift to high gear is initiated, the sleeve 84 provides upward pressure against the blocker ring 94 which in turn causes the friction surfaces between the friction cone 72 and the rings 92, 94 to develop torque carrying capacity, which starts to bring the high speed gear body 66 up to synchronized speed. As the torque is developed (from the counter-rotating shaft 16 to the driving gear 22 and in turn applied to the driven high speed gear 18 on the output shaft 14), reaction force having an axial component is transmitted to the high speed gear body 66. This axial reaction force, as discussed previously, is caused from the helical geometry of the gear mesh 22 on the body 66 of the high speed gear 22 as it inter-engages with the gear mesh on the high speed driven gear 18. This additional axial reaction force means that significant force is applied to the friction surfaces between the top end of the high speed gear body 66 and the driven gear body 62. The axial force creates an energizing shifting effect and promotes faster synchronization of the rotational speed of the high speed gear body 66 with the rotation of the driven gear body 62, the synchronizer 48, and the counter-rotating shaft 16. The axial forces on the high speed gear body 66 include the shifting force applied to the bottom side of the gear body by the synchronizer 48, as well as the axial reaction forces applied to the gear mesh 22. Therefore, in order to distribute the frictional pressure evenly, it is desired to provide six (6)

frictional interfaces at the top of the high speed gear body 66 and three (3) frictional surfaces on the bottom side of the high speed gear body 66. The use of nine (9) frictional surfaces has been found to provide sufficient torque carrying capacity to be substantially equal to engine torque at the cruising speeds in which it is desired to shift in to the high speed gear. Once the frictional surfaces are fully engaged and the rotational speed of the high speed gear body 66 is that of the counter-rotating shaft 16, force applied by the shifting fork to the sleeve 84 is increased, and the blocker ring 90 releases and the sleeve 84 is able to make a hard engagement with the clutch teeth 74 on the high speed gear body 66. The one-way clutch allows the output shaft 14 to rotate at a rate faster than the output shaft 14 is being driven by the low speed gear 26.

Using friction surfaces on the bottom of the high speed gear body 66 and at the top of the high speed gear body, allows the transmission to create enough torque carrying capacity to enable shifting into the high speed gear with a synchronizer type clutch, and to do so without significantly reducing engine torque. The precise speed and duration of the shift is controlled by the engine electronic control unit, however, and may include a partial reduction in engine torque if desired.

When a downshift is desired, the shift sleeve 84 is simply moved downward by shifting fork 44 to disengage the high speed gear 22. A downshift into a power off state will disengage both synchronizers 48, 50 from the high speed gear 22 and low speed gear 26 respectively.

Figure 8:
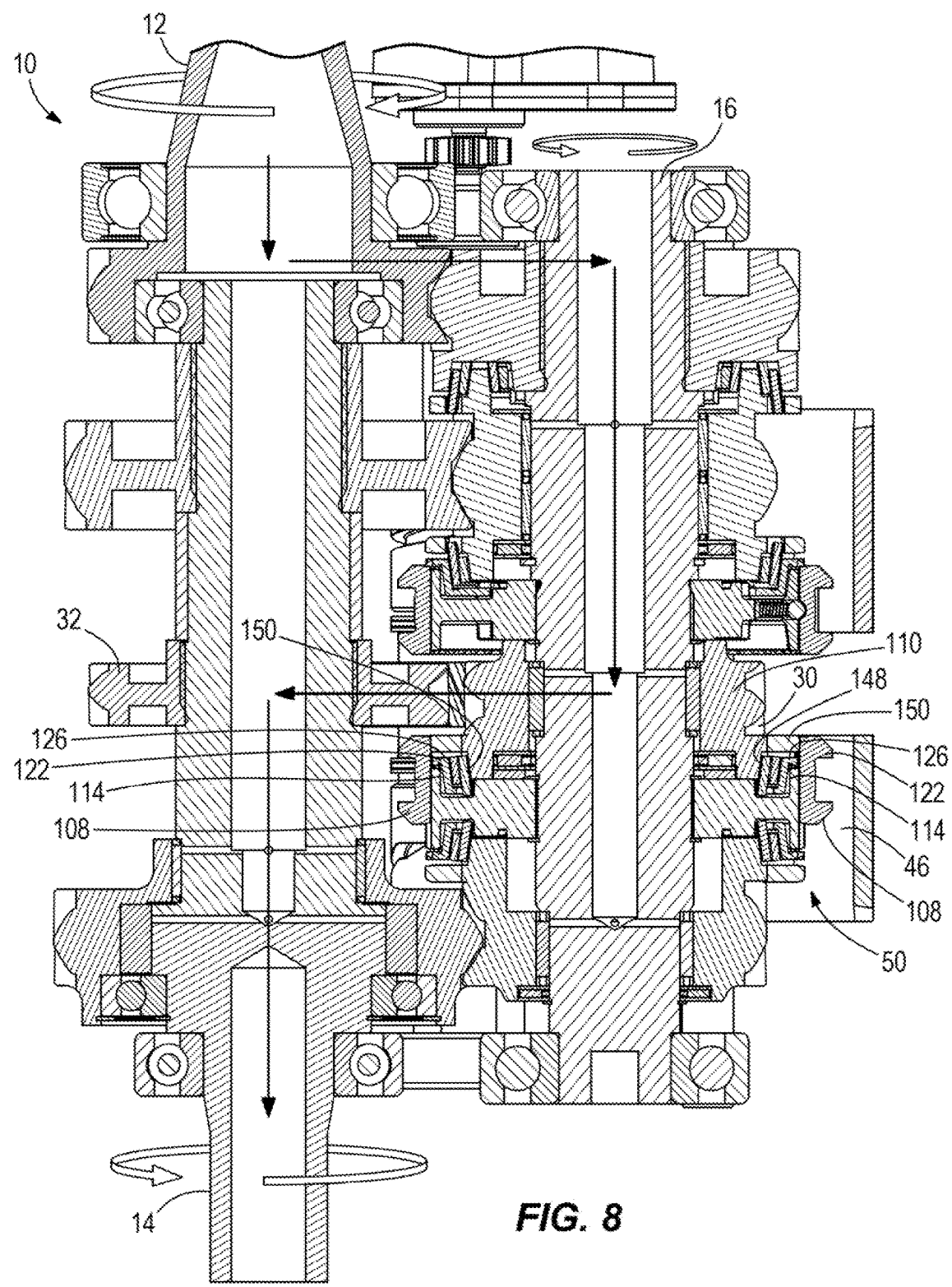
FIG. 8 is a view similar to FIGS. 5, 6 and 7 showing the transmission in a reverse position.

FIG. 8 shows the transmission 10 shifted into a reverse position. Shifting synchronizer 50 from neutral into reverse is conceptually similar to shifting synchronizer 50 from neutral into the low speed gear. When shifting into reverse, shifting fork 46 applies upward force on the sliding sleeve 108. As the shift is initiated, upward pressure on the blocking ring 114 and the friction surfaces generate torque. When the reverse gear 30 is brought up to speed, the blocker ring 114 releases and the shifting fork 46 provides additional axial force to push the sliding sleeve 108 into full engagement with the clutch teeth 150 on the body 110 of the reverse gear 30. The reverse gear 30 as mentioned is in constant mesh with a reverse idler gear 34 (see for example FIG. 3) which in turn is in constant mesh with the driven reverse gear 32 on the output shaft 14.

While the exemplary invention is shown in connection with a transmission having a reverse gear on the same counter-rotating shaft as the low speed and high speed gears, it should be apparent to those skilled in the art that the reverse shifting function can, if desired, be accomplished at some other location along the drive train. Also, as mentioned previously, the illustrated high speed synchronizing clutch mechanism is implemented to engage a high speed gear located on the described counter rotating shaft; however, the synchronizing clutch mechanism can be implemented in a transmission having a different configuration, e.g., to engage a high speed gear located on an input shaft or output shaft. Further, as also previously mentioned, the high speed synchronizing clutch mechanism can be employed in a variety of transmissions having different shaft configurations, and can generally be employed in a transmission in which the high speed gear is mounted coaxially with and free to rotate about a first shaft and the driven high speed gear is fixed on a second shaft. For example, the high speed gear and high speed synchronizer can be located on the input shaft in a transmission having a counter rotating output shaft.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A marine propulsion system comprising:
   an input drive shaft rotated by and receiving torque from an engine;
   an output shaft;
   a first gear fixed on the input shaft for common rotation with the input drive shaft;
   a counter rotating shaft arranged parallel to the input and output shafts;
   a second gear fixed on the counter rotating shaft for common rotation with the counter rotating shaft, the second gear on the counter rotating shaft being in constant mesh with the first gear on the input drive shaft so that the counter rotating shaft counter-rotates with the input shaft;
   a first high speed gear mounted coaxially with and free to rotate about the counter rotating shaft;
   a first low speed gear on the counter rotating shaft;
   a second high speed gear fixed on the output shaft for common rotation with the output shaft, the second high speed gear being in constant mesh with the first high speed gear on the counter rotating shaft;
   a second low speed gear on the output shaft being in constant mesh with the first low speed gear on the counter rotating shaft;
   a high speed synchronizing clutch mechanism that engages the first high speed gear on the counter rotating shaft to rotate at the same speed as the counter rotating shaft, said synchronizing clutch mechanism comprising a synchronizer hub that rotates in unison with the counter rotating shaft, a sliding sleeve mounted on the synchronizer hub and slidable to engage teeth on the body of the first high speed gear in order to rotate the first high speed gear in unison with the counter rotating shaft, at least one conical friction interface between the synchronizer hub and a body of the first high speed gear, and at least one conical friction interface between the body of the first high speed gear and the first gear on the counter rotating shaft;
   a shift actuator to shift the sliding sleeve into a high speed position and cause said friction surfaces to develop torque carrying capacity substantially equal to the engine torque prior to the shifting the sliding sleeve to engage the teeth on the body of the first high speed gear; and
   a one-way clutch mechanism that enables the output shaft to rotate faster than the second low speed gear on the output shaft and at the angular speed of the second high speed gear on the output shaft.

2. A marine propulsion system as recited in claim 1 wherein the first low speed gear is mounted for rotation coaxially with and free to rotate with respect to the counter rotating shaft and the system further comprises a second synchronizing clutch mechanism that engages the first low speed gear to rotate in unison with the counter-rotating shaft.

3. A marine propulsion system as recited in claim 2 further comprising a first reverse gear mounted for rotation coaxially with and free to rotate about the counter rotating shaft, a reverse idler gear in constant mesh with the first reverse gear, and a second reverse gear on the output shaft in constant mesh with the reverse idler gear; wherein the second synchronizing clutch mechanism includes a neutral position, a forward position in which the second clutch mechanism engages the first low speed gear on the counter rotating shaft and a reverse position in which the second clutch mechanism engages the first reverse gear on the counter rotating shaft.

4. A marine propulsion system as recited in claim 1 wherein the first high speed gear has a helical gear mesh and the second high speed gear has a helical gear mesh.

5. A marine propulsion system as recited in claim 1 wherein six synchronizing friction interfaces are between the synchronizer hub and the body of the first high speed gear, and three synchronizing friction interfaces are between the body of the first high speed gear and the body of the second gear on the counter rotating shaft.

6. A marine propulsion system as recited in claim 1 wherein the body of the first high speed gear includes a friction cone at its lower end and a friction cone at its upper end and engagement teeth below a gear mesh on the body of the first high speed gear and above the friction cone at its lower end.

7. A marine propulsion system as recited in claim 6 wherein the friction cone on the upper end of the first high speed gear includes an inner friction surface and an outer friction surface and wherein a mating inner friction surface and outer friction surface are located on the body of the second gear on the counter rotating shaft.

8. A marine propulsion system as recited in claim 7 further comprising a pair of friction rings between the inner friction cone on the body of the second gear and the inner friction cone on the body of the first high speed gear and a pair of friction rings between the outer friction cone on the body of the second gear and the outer friction cone on the body of the first high speed gear.

9. A marine propulsion system as recited in claim 8 wherein one of the friction rings of each pair of friction rings has dual frictional surfaces and one has a single frictional surface.

10. A marine propulsion system as recited in claim 8 wherein the synchronizer hub comprises a well in which a blocker ring, another outer frictional ring and another inner frictional ring reside at least in part.

11. A marine propulsion system as recited in claim 10 wherein the body of the first high speed gear is spring biased in the neutral position away from the synchronizer hub and components rotating with the synchronizer hub and away from the second gear and components rotating with the second gear.

12. A marine propulsion system as recited in claim 1 wherein the output shaft is drivingly connected to one or more propellers.

13. A high-speed transmission comprising:
a first shaft;
at least one synchronizer cone rotating in unison with the first shaft;
a second shaft offset from the first shaft;
a first high speed gear mounted coaxially with and free to rotate about the first shaft;
a second high speed gear fixed on the second shaft for common rotation with the second shaft, the second high speed gear being in constant mesh with the first high speed gear on the first shaft;
a high speed synchronizing clutch mechanism that engages the first high speed gear on the first shaft to rotate at the same speed as the first shaft, said synchronizing clutch mechanism comprising a synchronizer hub that rotates in unison with the first shaft, a sliding sleeve mounted on the synchronizer hub and slidable to engage teeth on the body of the first high speed gear in order to rotate the first high speed gear in unison with the first shaft, at least one synchronizing friction interface between the synchronizer hub and the body of the first high speed gear, and at least one synchronizing friction interface between the body of the first high speed gear and said synchronizer cone rotating in unison with the first shaft;
a shift actuator to shift the sliding sleeve into a high speed position and cause said friction interfaces to develop torque carrying capacity substantially equal to the engine torque prior to the shifting the sliding sleeve to engage the teeth on the body of the first high speed gear;
a low speed gear on the second shaft; and
a one-way clutch mechanism that enables the second shaft to rotate faster than the low speed gear on the second shaft and at the angular speed of the second high speed gear on the second shaft.

14. A high-speed transmission as recited in claim 13 wherein the low speed gear is mounted for rotation coaxially with and free to rotate with respect to the first shaft and the transmission further comprises a second synchronizing clutch mechanism that engages the low speed gear to rotate in unison with the first shaft.

15. A high-speed transmission as recited in claim 14 further comprising a first reverse gear mounted for rotation coaxially with and free to rotate about the first shaft, a reverse idler gear in constant mesh with the reverse driving gear, and a second reverse gear on the second shaft in constant mesh with the reverse idler gear; wherein the second synchronizing clutch mechanism includes a neutral position, a forward position in which the second clutch mechanism engages a low speed gear on the first shaft and a reverse position in which the second clutch mechanism engages the first reverse gear on the first shaft.

16. A high-speed transmission comprising:
a first shaft;
at least one synchronizer cone rotating in unison with the first shaft;
a second shaft offset from the first shaft;
a first high speed gear mounted coaxially with and free to rotate about the first shaft;
a second high speed gear fixed on the second shaft for common rotation with the second shaft, the second high speed gear being in constant mesh with the first high speed gear on the first shaft;
a high speed synchronizing clutch mechanism that engages the first high speed gear on the first shaft to rotate at the same speed as the first shaft, said synchronizing clutch mechanism comprising a synchronizer hub that rotates in unison with the first shaft, a sliding sleeve mounted on the synchronizer hub and slidable to engage teeth on the body of the first high speed gear in order to rotate the high speed gear in unison with the first shaft, at least one synchronizing friction interface between the synchronizer hub and the body of the first high speed gear, and at least one synchronizing friction interface between the body of the first high speed gear and said synchronizer cone rotating in unison with the first shaft;

a shift actuator to shift the sliding sleeve into a high speed position and cause said friction interfaces to develop torque carrying capacity substantially equal to the engine torque prior to the shifting the sliding sleeve to engage the teeth on the body of the first high speed gear;

wherein the body of the first high speed gear includes a friction cone at its first end and a friction cone at its second end and engagement teeth between the gear mesh on the body and the first friction cone.

17. A high-speed transmission as recited in claim 16 wherein the first high speed gear has a helical gear mesh and the second high speed gear also has a helical gear mesh.

18. A high-speed transmission as recited in claim 16 wherein six synchronizing friction interfaces are between the synchronizer hub and the body of the first high speed gear, and three synchronizing friction interfaces are between the body of the first high speed gear and said synchronizer cone rotating in unison with the first shaft.

19. A high-speed transmission as recited in claim 16 wherein the body of the first high speed gear is spring biased in the neutral position away from the synchronizer hub and components rotating with the synchronizer hub and away from said synchronizer cone on the first shaft and components rotating with said synchronizer cone.

* * * * *